Nov. 5, 1968 J. G. BANE 3,408,741
SLOPE COMPENSATOR INSTRUMENTS
Filed Nov. 21, 1967 3 Sheets-Sheet 1
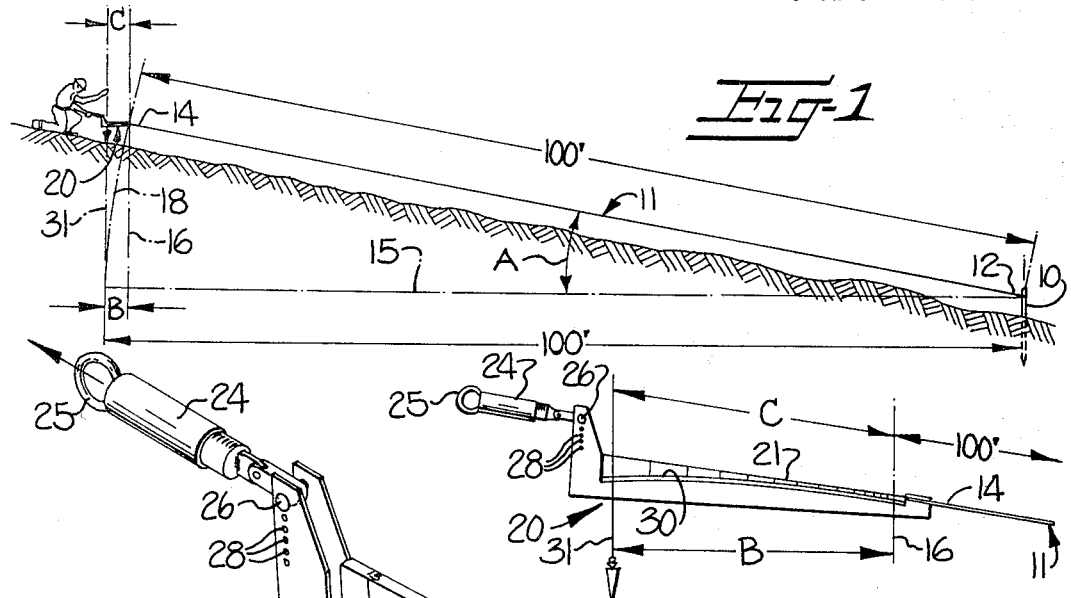
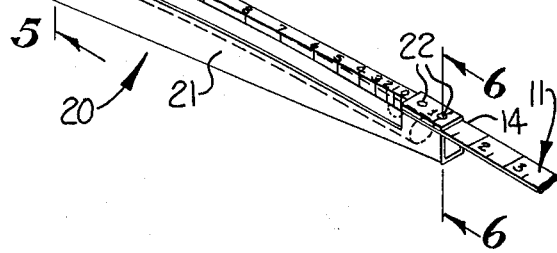
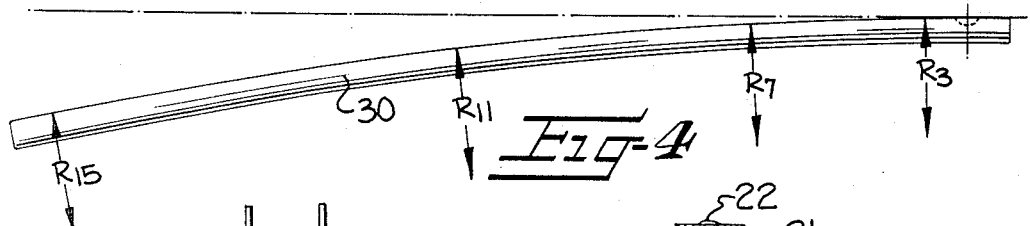
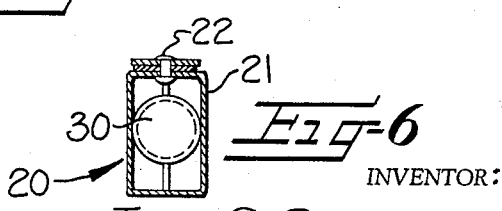
INVENTOR:
JOHN G. BANE
BY Parrott, Bell, Seltzer, Park & Heard
ATTORNEYS

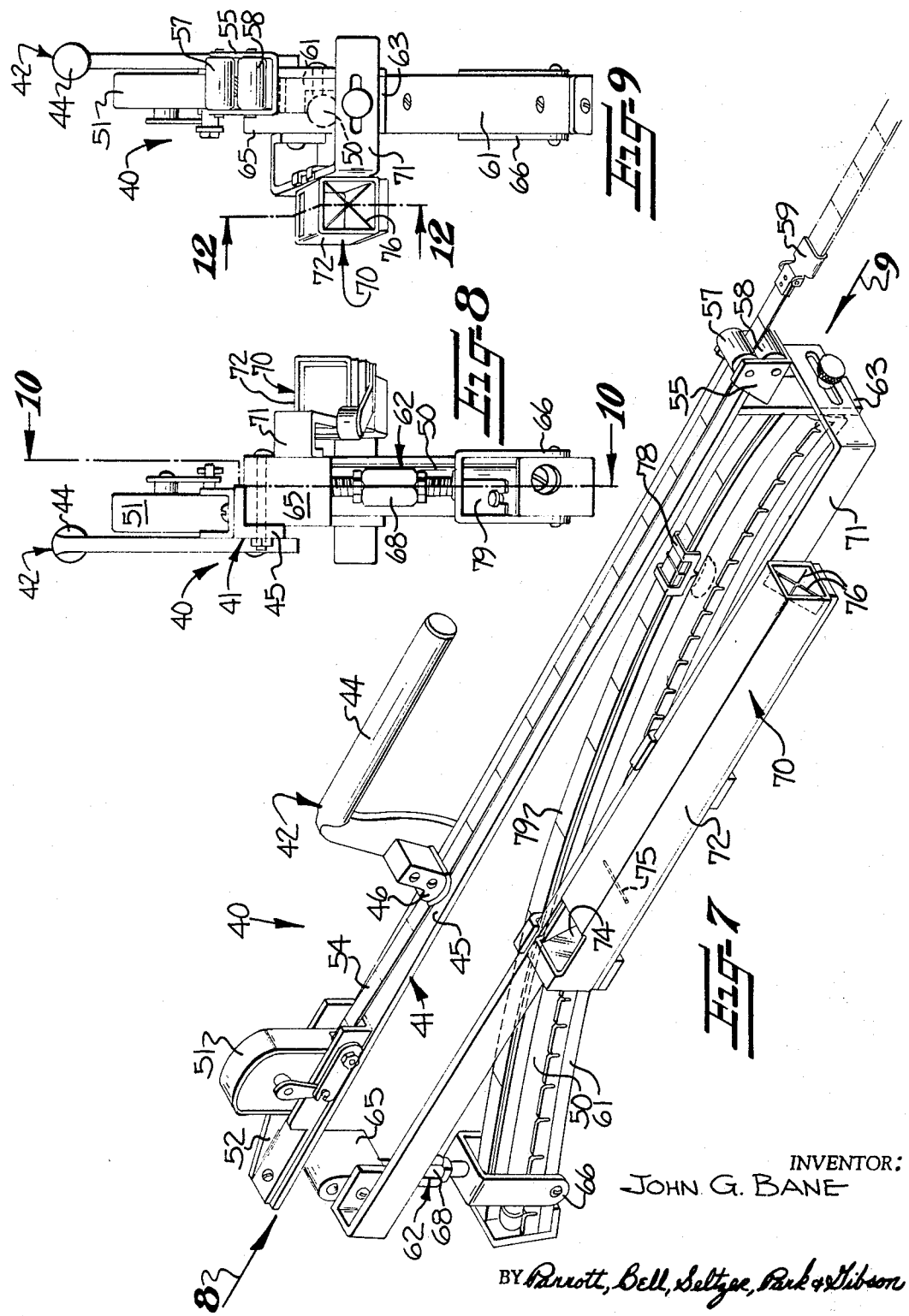

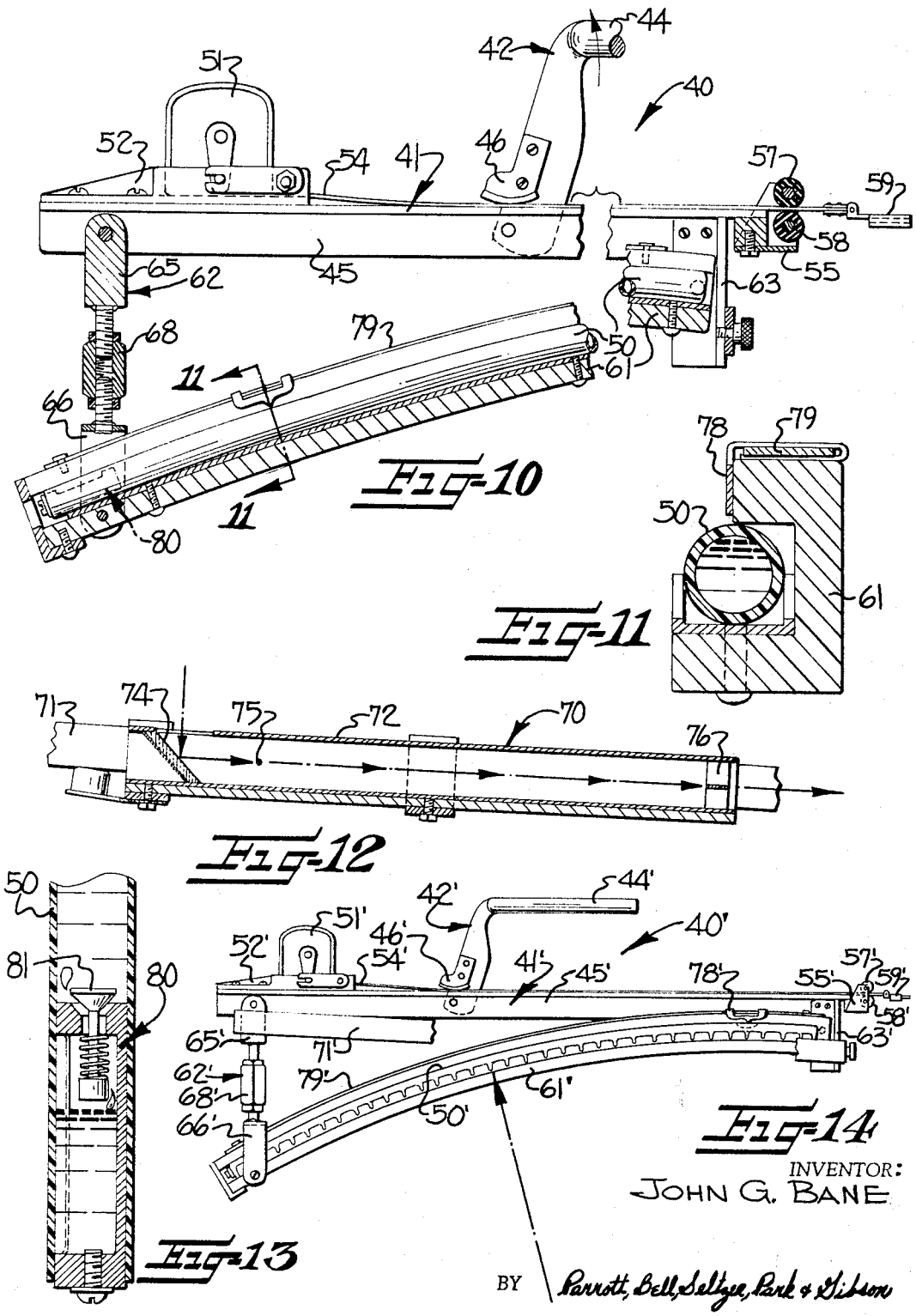

United States Patent Office  3,408,741
Patented Nov. 5, 1968

3,408,741
SLOPE COMPENSATOR INSTRUMENTS
John G. Bane, 285 S. Stratford Road,
Winston-Salem, N.C. 27103
Continuation-in-part of application Ser. No. 512,730,
Dec. 9, 1965. This application Nov. 21, 1967, Ser.
No. 687,417
12 Claims. (Cl. 33—71)

ABSTRACT OF THE DISCLOSURE

A hand held bracket carrying a bubble level is attached to a measuring tape of predetermined length. The tape is stretched along a slope and the bracket aligned with the tape. The bubble moves in its tube to indicate against co-operating indicia a correction distance. An adjustable correction tape is connected between the bracket and the measuring tape to adjust the length of the measuring tape by the indicated correction distance so that the horizontal projection of the corrected length of the measuring tape is equal to the original predetermined length of the measuring tape. The correction distance can also be subtracted from the original predetermined length of the measuring tape so that corrected length of the measuring tape is equal to the horizontal projection of the original predetermined length of the measuring tape when it is stretched along the slope.

---

This application is a continuation-in-part of my earlier filed, copending application Ser. No. 512,730, now abandoned, filed Dec. 9, 1965, and entitled, "Slope Compensator."

In surveying tracts of land, distances from point to point or stake to stake along a line traversing the land (referred to herein as a traverse line) are conventionally expressed as though measured in a horizontal plane, and the most widely used method for locating points along such a traverse line (referred to herein as traverse points) relies upon the use of a measuring instrument of predetermined end to end length, which in preferred practice is a steel tape. Where the land being surveyed is quitet flat, or horizontal, and the traverse is limited to relatively short distances, no exceptional difficulty arises in the use of measuring tapes to locate traverse points. Where the land is rolling or contoured, and particularly where a large area of rolling land is to be surveyed, the use of a surveying tape to locate traverse points becomes more difficult.

More particularly, when a tape is positioned on a slope to determine the distance between two points which are at different elevations, the true horizontal distance between the two traverse points is not the same as the slope distance along the tape, and a correction must be made in order for the true horizontal distance between the points to be correctly noted. Similarly, when two points are to be located at the ends of the tape, the points are not at a true horizontal distance equal to or directly determinable from the length of the tape, and field notes of the survey record are made more complicated. Heretofore, the correction required to obtain true horizontal distance necessitated a complex mathematical calculation (as described, for example, in Articles 18–20 of Surveying by Breed, 2nd edition, 1957, John Wiley & Sons, Incorporated, New York, N.Y., at pages 14 and 15), and true horizontal distance measurements could not be directly laid out on sloping land at the time of a survey as by directly locating traverse points at predetermined horizontal distance intervals on the land during the field survey with no mathematical calculation or at most with simple addition or subtraction.

In view of the above, it is an object of my invention to provide a slope compensator adapted for use with a standard measuring tape, or other similar instrument, for directly locating a point at a true horizontal distance from a fixed starting point, irrespective of an elevation distance between the points. In accomplishing this object, the slope compensator of this invention effectively corrects the slope distance measurement, as defined by the length of the measuring tape, by a correction distance measurement of proper length as related to the length of the tape and the angle of slope at which it is disposed so that a plumb line dropped at a correction distance point will indicate a true horizontal distance, from the opposite end of the measuring tape, equal to the predetermined length of the tape or determinable therefrom with no more complex mathematical calculation than simple addition or subtraction. That is, through the use of the slope compensator of my invention, a traverse point may be directly laid out on the land being surveyed which is a predetermined true horizontal distance from a fixed traverse point, even though the tape used to determine distance is disposed on a slope, or at an angle to the horizontal.

With the object and some advantages of my invention having been stated, others will appear as the description proceeds when taken in connection with the accompanying drawings, in which—

FIGURE 1 is a partly schematic, elevational view, illustrating the use and theoretical geometry of a slope compensator instrument in accordance with my invention;

FIGURE 2 is a slightly enlarged side elevational view of a first form of instrument of my invention;

FIGURE 3 is a further enlarged perspective view of the instrument of FIGURE 2;

FIGURE 4 is an elevational view of a spirit level tube forming a portion of the instrument of FIGURE 3;

FIGURE 5 is an enlarged sectional view through the instrument of FIGURE 3, taken along the line 5—5;

FIGURE 6 is an enlarged sectional view of the instrument of FIGURE 3, taken along the line 6—6;

FIGURE 7 is a perspective view of a second form of instrument in accordance with my invention;

FIGURES 8 and 9 are end elevation views of the instrument of FIGURE 7, taken respectively as indicated by the arrows 8 and 9 in FIGURE 7;

FIGURE 10 is a side elevation view, in partial section, of the instrument of FIGURE 7, taken generally along the line 10—10 in FIGURE 8;

FIGURE 11 is an enlarged sectional view through the spirit level tube and support of the instrument of FIGURE 7, taken generally along the line 11—11 in FIGURE 10;

FIGURE 12 is a side elevation view, in section, through the optical sight of the instrument of FIGURE 7, taken generally along the line 12—12 in FIGURE 9;

FIGURE 13 is an enlarged sectional view through a valve construction disposed within the spirit level tube of the instrument of FIGURE 7; and FIGURE 14 is a reduced side elevation view of a third form of instrument in accordance with my invention.

Referring now more particularly to the drawing, the operation of the instruments contemplated by my invention, as well as the geometrical principles upon which that operation is based, may best be understood at the outset from a brief description of the use of a surveying tape in locating points at perdetermined true horizontal distances.

Generally, in measuring distances over the surface of land and in locating points thereon during a survey of the land, a distance measuring surveying instrument of predetermined length, such as a tape, is conventionally used. Tapes of various lengths, such as 50 feet, 100 feet, or 200 feet, are normally among the surveying instruments used by a surveying party. Points along a line traversing the land are located, and the distance therebetween measured, by maintaining one end of a tape at a predetermined position, such as a base point determined by a stake 10 (FIGURE 1), and the end of a tape 11 so held is herein referred to as a fixed end 12. Thereafter, the tape 11 is aligned with the direction of the line being surveyed, either by eye or by the use of an instrument, such as a transit, and held in position close to the surface of the land.

Heretofore, a second point, which may be an end point of a traverse line, was located by dropping a plumb line at the point on the tape 11 remote from the fixed end 12, referred to herein as a measuring end 14 of the tape. When a plumb line is dropped directly at the measuring end 14 to locate a traverse line point, the distance along the line of the tape between the first and second points is equal to the predetermined end-to-end length of the measuring portion of the tape 11, such as 100 feet. Where the tape is being used over rolling or contoured land (as in FIGURE 1), the elevation of the two points is different, and the end point located by a plumb line dropped directly at the measuring end 14 may be higher than or above the base point at which the fixed end 12 of the tape is located. The predetermined distance between traverse points, equal to the measuring length of the tape, is thus a slope distance and not a true horizontal distance as must be properly noted in a plat or record of the survey.

The slope of the tape 11, relative to a true horizontal line (indicated in FIGURE 1 by the line 15), is determined by the contour of the land being traversed, and may be indicated either in terms of a vertical angle of slope A included between the tape 11 and a true horizontal line 15, or in terms of the elevation of the measuring end 14 of the tape 11 above the fixed end 12. Either manner of noting the slope of the tape 11 is normally calculated from appropriate transit measurements. In order to include in the record of a survey the true horizontal distance between traverse points determined in the manner described above, it is necessary to mathematically calculate a correction distance to be substracted from the predetermined length of the tape.

The geometry of the slope and horizontal distances which necessitates the correction of the distance between the traverse points located as described above is made more clear by noting that a plumb line dropped directly at the measuring end 14 of the tape 11, as described above, will describe a vertical line 16 intersecting the true horizontal line at a distance from the base point 10 less than the predetermined length of the tape 11. This is made apparent by an arcuate line 18, representing the path which would be described by the measuring end 14 of the tape 11 were the tape pivoted about the base point 10 to reach a position congruent with the horizontal line 15. The correction distance may thus be defined as the difference between the horizontal projection of the slope distance and the true horizontal distance equivalent to the slope distance, and is indicated as B. The correction distance B along the horizontal line 15 is mathematically defined as:

$$B = T \text{ vers } A$$

where T is the linear measurement of the end-to-end length of the tape 11 and A is the vertical angle of slope.

In order to make possible the location of a point which is at a predetermined horizontal distance from a base point, the compensator instruments contemplated by my invention provide a means capable of effectively adding to the slope distance a correction distance having a horizontal projection equal to a correction distance B mathematically calculated as described above and for indicating that correction distance at a point herein referred to as a correction point. By dropping a plumb line at such a correction point, a surveying crew member may locate a traverse point which is a slope distance from a base point equivalent to a predetermined true horizontal distance, corresponding to the length of the surveyor's tape used. The correction distance, identified as C when projected onto the slope line defined by the tape 11 and which is to be added to the slope distance of the tape 11 (FIGURE 2), is equal to correction distance B when projected onto horizontal line 15 and is mathematically defined as:

$$C = \frac{T}{\cos A} - T$$

A first form of instrument as contemplated by my invention is shown in a perspective view in FIGURE 3. This first compensator, generally indicated at 20, comprises a frame 21, to one end of which a surveyor's tape 11 is coupled by suitable tape engaging means, such as rivets 22. At the opposite end of the frame 21 is preferably provided a means for manually holding the compensator and for applying tension to the tape 11 to remove sag as is consistent with good surveying practice. The means preferably takes the form of a ring 25 to be gripped by a tapeman and operatively connected to the frame 21 by a spring scale 24, calibrated to desired force increments. The scale 24 is preferably secured to the frame 21 by a pin 26 which may pass through any one of a plurality of pairs of aligned holes 28 in the frame 21. This adjustability is provided in order to permit a user to accommodate the compensator 20 to the flexibility of any particular tape and thereby avoid torques or bending moments otherwise arising in the tape upon tensioning of the scale 24 and which would displace the frame 21 from the desired alignment with the tape 11. adjustment of the pin connection is required only when the compensator is first put into service with a particular tape, and is not varied as a matter of course during the use of the instrument.

Secured in the frame 21 is a spirit level tube 30 of predetermined length and precise curvature. The spirit level tube 30 is filled with a suitable liquid to include a small leveling bubble, as is known generally in the art of spirit levels. In accordance with this invention, the curvature of the spirit level tube 30 is such, with respect to the predetermined length of the tape 11 and the slope angles at which the tape 1 is positioned during use, that the level position sought by the bubble within the spirit level tube 30 will be a distance from the measuring end of the tape 11 equal to the horizontal projection of the correction distance C, or the distance B, described above. Preferably, the frame 21 also carries indicia (FIGURE 3) indicative of the height difference between the fixed and measuring ends of the tape 11, or other suitable standards of measurement which will be readily understood by a surveying crew member.

At one end of the tube 30 (to the right in FIGURE 3) is located a calibration or zero point, corresponding to one end point of the calibrated length of the tape 11. As the tape 11 and the comensator 20 are disposed at varying slope angles A, the bubble within the spirit level tube 30 will move from the calibration or zero point (toward the left in FIGURE 3) and seek an increment of length along the tube 30 which is level at that particular slope angle. Due to the precise curvature of the tube 30, the location at which the bubble comes to rest will be a predetermined distance from the calibration point, equivalent to the correction distance C as projected onto the slope of the tape 11 or the correction distance B as projected onto a horizontal line, and a plumb line dropped directly at the bubble by a tapeman will contact the surface of the land being surveying at a true horizontal distance from the fixed end 12 of the tape 11 equal to the predetermined length of the tape. Accordingly, an end point located at the point of plumb bob contact will be a true horizontal distance from the base point at which the stake 10 is driven equal to the length of the tape and mathematical correction of the survey records will not be required.

To obtain this operation, the curvature of the spirit level tube 30 must be precisely determined and related to the length of the distance measuring instrument, or tape 11, and to the slope angles A at which the tape will be disposed during use. From an empirical determination of the curvature required, I have found that the radius of curvature of each incremental length of the tube 30 must vary from that of adjacent incremental lengths and, as the correction distance must increase as a function of the angle of slope, the radius of curvature will increase as the correction distance to be added to the tape length must increase. For example, considering the increments of the spirit level tube 30 at which the bubble will be positioned with elevations between the ends of the tape 11 equal to 3, 7, 11 and 15 feet (FIGURE 3), the radius $R_{15}$ at the greatest correction distance position will be greater than the radii $R_{11}$, $R_7$, and $R_3$ at the lesser correction distances. The correction distances L from the zero point of the spirit level tube 30 must increase progressively as a function of the angle of slope and the length of the tape, and as the radii $R_3$, $R_7$, $R_{11}$ and $R_{15}$ similarly increase. In the initial instruments constructed, these radii were empirically determined for stated lengths of tapes, such as 100 feet, and the spirit level tubes 30 were contoured by hand to obtain the precise curvatures required.

The mathematical relations of the correction distances B and C to the length of the tape 11 and the slope angle A have been expressed above. While the radii of spirit level tube curvature have heretofore been determined empirically, the radius at any increment of length of the tube may be determined by mathematical expressions derived from those mathematical relations by an analysis as follows. At any given increment of length, the length L of the spiral level tube from the zero point is substantially identical to the horizontal correction distance B, or $$L = B = T \text{ vers } A \qquad \text{(Equation 1)}$$

Further, at the incremental length L, the radius of curvature R of the spirit level tube is assumed to be equal to the distance from the end of the corrected length horizontal line 15 to the elevated end 14 of the tape 11. Analyzing a triangle having as its three sides the tube radius R, the correction distance B and the height $h$ (along line 16) wherein B and $h$ are perpendicular, $$R^2 = B^2 + h^2$$

where $B = T \text{ vers } A$ $h = T \sin A$

Therefore $R^2 = (T \text{ vers } A)^2 + (T \sin A)^2$
$= (T - T \cos A)^2 + (T \sin A)^2$
$= T^2[1 - 2 \cos A + \frac{1}{2}(1 + \cos 2A)]$
$\qquad + T^2[\frac{1}{2}(1 - \cos 2A)]$
$= T^2 - 2T^2 \cos A + \frac{1}{2}T^2 + \frac{1}{2}T^2 \cos 2A$
$\qquad + \frac{1}{2}T^2 - \frac{1}{2}T^2 \cos 2A$
$= 2T^2 - 2 \cos A$
$= T^2[2(1 - \cos A)]$ Therefore $$R = T\sqrt{2 \text{ vers } A} \qquad \text{(Equation 2)}$$

By substitution of values for T and A into Equation 1 and 2 above, the particular radii for incremental lengths of the spirit level tube may be calculated, and an operational instrument constructed.

Due to the highly complex nature of the precise mathematical description of the curve on which the spirit level tube 30 is formed, as compared with the relatively simple mathematical relations from which Equations 1 and 2 above are derived, the mathematical expressions for the radius of incremental lengths of the tube 30 given above are approximate only. A full mathematical description of the curve of the tube 30 is not necessary in order to construct an operative device, however, as this approximation has been found to be sufficiently accurate for most surveying purposes.

While the form of slope compensator instrument described immediately above is particularly attractive where the length T of the tape involved is relatively short and the possible variations in elevation between the measuring end 14 of the tape and the true horizontal line 15 are not excessive, constructing such an instrument for use with a longer tape and at a greater range of elevation differences results in the instrument becoming very large, bulky, and unwieldy and thus difficult for a tapeman to handle. For this reason, the first form of slope compensator instrument contemplated by my invention is probably best suited to relatively short tape lengths and to use in surveying land which is not excessively rolling. My invention, contemplates, however, that a slope compensator instrument may be provided which operates on substantially the same principles set forth above but yet is readily adaptable for use with tapes of whatever length a surveyor may choose and at elevational differences greater than those to which the instrument 20 is adapted. Such an additional form for the slope compensator of my invention is shown in FIGURES 7–13, and identified generally at 40. In similarity to the instrument 20, the slope compensator 40 comprises a frame 41 on which is mounted a spirit level tube 50. Pivotally connected to the frame, and substantially overlying the center of gravity thereof, is a handle member 42 including a hand-engageable portion 44 extending generally parallel to the upper surface of the frame. Mounted on a portion of the pivoting handle 42, immediately adjacent the upper surface of a top frame rail 45, is a gripping shoe 46, which functions as pointed out more fully hereinafter. The pivotal connection of the handle 42 to the frame 41 is such that, when the instrument is held by an operator grasping the hand engaging portion 44, the gripping shoe of 46 is pivoted toward the top rail 45.

Adjacent one extremity of the frame 41 (to the left in FIGURES 7 and 10) is a correction distance tape case 51, secured to the top rail 45 of the frame 41 by any suitable manner such as a bracket 52. A correction distance measuring tape 54, normally stored in the tape case 51, extends therefrom and longitudinally of the frame 41 along the upper surface of the top rail 45, passing between the upper surface of the top rail 45 and the gripping shoe 46 so as to be engaged thereby. Due to this positioning of the tape 54, a pinching force is exerted thereon by the gripping shoe 46 when the instrument is grasped by the handle 42, as described above. At the opposite extremity of the compensator 40 from the tape case 51 (to the right in FIGURES 7 and 10) are provided guide means in the form of a bracket 55 and a pair of rollers 57 and 58 mounted thereon. The tape 54 passes between the guide rollers 57 and 58, and is provided with means at a terminal extremity thereof beyond the rollers for interconnection with the end of a surveyor's tape. The interconnecting means, in the form of a clip 59, is constructed to firmly engage a surveying tape and hold to the same interconnected with the correction distance measuring tape 54. The measuring tape 54 is marked off in increments of length from a zero point, which is matched to one end point of the measuring length of a surveyor's tape as the instrument is connected thereto for use.

The spirit level tube 50 of the compensator 40 is mounted upon a lower frame member 61, which is secured relative to the upper rail 45 by an adjustable rear standard 62 and a forward standard 63. The adjustable rear standard includes upper and lower brackets 65 and 66 pivotally connected to the top rail member 45 of the frame and to the lower frame member 61, respectively, and a turn-buckle barrel 68 engaging threaded studs carried by the brackets 65 and 66. This adjustability of the lower frame member 61 relative to the top rail 45 of the frame 41 is provided in order to assure ready calibration of the compensator 40 when first put in to use, and the relationship between the top rail 45 and the lower frame member 61 is not normally varied as a matter of course during the use of the instrument.

In order to assure that the frame 41 of a compensator 40 is properly aligned relative to the end points of the line being surveyed, particularly with longer lengths of surveyor tapes which are of such weight as to sag significantly, means other than the relatively simple tensioning spring provided for the first form of compensator 20 are incorporated into the second form of instrument. In particular, an optical sight generally indicated at 70 (FIGURES 7, 9 and 12) is provided and secured to the frame 41 of the compensator 40. In particular, a sight rail 71 is secured to the rear and front standards 62 and 63. Mounted on the sight rail 71, for sliding movement thereon, is a sight tube 72, enclosing therewithin an angled mirror 74, a horizontal crosswire 75 immediately forward of the angled mirror 74 and crosshair members 76 in the open forward extremity of the sight tube 72. The purpose of the sliding adjustment of the sight tube 72 on the side rail 71 will be pointed out more fully hereinafter, but it is believed apparent that a tapeman holding the compensator instrument 40 by the handle 42 and looking downwardly into the optical sight 70 may align the crossbar 75 and crosshairs 76 with a target at the remote or fixed end of a surveying tape (at a distance of 100 or 200 feet from the instrument 40) and thereby assure that the frame 41 of the compensator 40 is in a predetermined angular relationship to the slope line of the surveying tape even though the tape may sag to a substantial extent.

In order to facilitate determination of the correction distance to be added to the slope distance in obtaining a true horizontal distance between end points of a line, my invention contemplates that the compensator 40 be provided with a sliding pointer 78 secured adjacent the spirit level tube 50 for movement along a scale member 79 which is removably secured in position on the lower frame member 61. The sliding pointer 78 is adapted to be positioned immediately overlying the center of a bubble moving within the spirit level tube 50 when the frame 41 of the compensator 40 is positioned in the required orientation relative to the end points of the line being surveyed. That is, when the optical sight 70 has been used by a tapeman to position the compensator 40 in the required attitude for use, the sliding pointer 78 may then be moved to a position immediately overlying a bubble within the spirit level tube 50, and the tapeman may then be relieved from the careful attention necessary to maintain the compensator 40 in the required attitude. The use of the sliding pointer 78 and the slidable mounting of the optical sight 70 on the sight rail 71 cooperate to facilitate use of the instrument by a single individual, in that the sight tube 72 may be positioned with the angled mirror 74 substantially in general vertical alignment with a location of the bubble within the spirit level tube 50, relieving the tapeman from the necessity of dividing his attention between two indicating devices separated by the length of the frame of the compensator 40.

In order to precisely locate the correction point at which a plumb line may be dropped to indicate a true horizontal distance, the scale 79 of the compensator 40 preferably is calibrated in terms of correction distances. Thus, when the sliding pointer 78 is positioned overlying the bubble within the spirit level tube 50, a correction distance may be read directly from indicia carried by the scale 79. In order to locate the correction point, the tapeman would then relax the pinching force exerted on the tape 54 by grasping the frame 41 of the compensator 40 and releasing the handle 42, and withdraw a sufficient length of the correction distance tape 54 from within the tape case 51 to bring the indicated correction distance tape 54 from within the tape case 51 to bring the indicated correction distance marker on the tape 54 into clear view. Thereafter, the tapeman would again grasp the hand-engaging portion 44 of the handle 42, to snub the extended portion of the tape 54 snugly against the frame 41 of the compensator 40, use the optical sight 70 to properly align the compensator 40, and drop a plumb bob at the length marking along the tape 54 which corresponds to the correction distance indicated by the sliding pointer 78 on the scale 79.

In view of the use of the correction distance tape 54 in the compensator 40 of this invention, as described immediately heretofore, the spirit level tube 50 may be configured in accordance with the mathematical expressions set forth above, and a plumb bob dropped directly at the spirit level bubble if desired, or a third form of instrument may be made wherein the spirit level tube has some curvature other than the complex curvature outlined above, such as having a single, uniform radius so that the entire length of the tube lies along an arc of a circle about a long radius (FIGURE 14). However, it must be noted that the choice of radius of curvature of the spirit level tube 50 will affect the non-linearity of indicia on the scale 79, and that a choice of radius must be made carefully in order to assure that calibration can be obtained.

Further, removability of the sliding pointer 78 and scale 79 opens the possibility of providing a number of interchangeable scales, each of which may be calibrated for the curvature of the spirit level tube 50 (or 50' in FIGURE 14) and to a specific length of tape. As a result, a single compensator 40 may be made adaptable to any length of surveying tape which has been adopted for use, making a single compensator instrument more widely adaptable for use by a surveyor.

In order to assure that the size of the bubble within the spirit level tube 50 is of proper size to permit obtaining necessary accuracy, this invention further provides means within the spirit level tube 50 for controlling the size of the bubble therewithin. In particular, a spring-loaded valve arrangement 80 is provided adjacent one extremity of the tube 50 (FIGURES 10 and 13). The valve assembly is spaced inwardly from the end of the tube a distance sufficient to provide a chamber for receiving a small quantity of spirit level liquid. A spring loading force on a valve member 81 is sufficiently light so that the valve member may be slightly dislodged by a jarring blow against the frame of the compensator 40. In the event that the bubble of the spirit level tube 50 is located during use of the compensator 40 in a portion of the tube of small radius and a bubble of short length is preferred in order to assure accuracy, the instrument may be tilted with the valve end of the spirit level tube located upwardly and the frame struck to dislodge the valve and emit liquid into the main body of the spirit level tube 50. The emission of a liquid into the main body of the tube 50 and with the release of air therefrom, will reduce the size of the bubble contained within the tube, as is desired. Conversely, the instrument 40 may be disposed with the valve end of the spirit level tube located downwardly and the valve operated to release additional air into the spirit level tube 50 and enlarge the size of the bubble, if so desired.

While the discussion above has proceeded with reference to the effective addition of a correction distance to the length of a tape, it is believed readily apparent that the instrument of my invention may be employed to determine the true horizontal distance between points which are located at a slope distance equal to the length of the tape. In such operation, points along a line are located in the conventional manner and the horizontal distances may be recorded in the survey notes as the tape length less the indicated correction distance. While such operation is a recognized possibility, it is believed that the instrument will be of greater value when used as first described above.

In conclusion, it is apparent that the compensators of my invention have provided surveyors with a means for locating, in the field, points which are at predetermined true horizontal distances, even though there may be a vertical distance or height difference between the points. This is accomplished without necessitating individual mathematical calculation and correction of the survey record and permits the location of surveying reference points, in the field, in a manner which will substantially simplify the preparation of both field notes and plats drawn from such field notes.

In the drawings and specifications there have been set forth preferred embodiments of the invention and although specific terms are employed, they are used in a generic and descriptive sense only and not for purposes of limitation.

I claim:

1. A slope compensator instrument for use with a surveyor's distance measuring tape of predetermined [end-to-end] length in locating two points along a line which are spaced apart a predetermined true horizontal distance without necessitating complex mathematical calculation to correct for an elevation difference between the two points, the instrument comprising a frame, handle means operatively connected to said frame and adapted to be gripped by an operator for holding the instrument during use, tape engaging means carried by said frame and adapted for coupling the instrument to one end of a surveyor's tape, and means carried by said frame and correlated to the length of said tape and to varying slope angles of said tape for indicating a correction distance required to correct the length of said tape so that the horizontal projection of said corrected length is equal to said true horizontal distance between said two points.

2. An instrument as claimed in claim 1 further comprising means for locating a correction point corresponding to one of said two points which when projected vertically to the surface being surveyed is spaced a true horizontal distance equal to the length of the measuring tape from a point at the opposite end of the tape corresponding to the other of said two points.

3. An instrument as claimed in claim 2 wherein said means for indicating a correction distance comprises a level seeking device and wherein the instrument further comprises means for facilitating disposition of said frame in a predetermined alignment with a tape to which the instrument is coupled during use of the instrument to locate the correction point.

4. An instrument as claimed in claim 3 wherein said level seeking device comprises an elongate curved spirit level tube substantially filled with liquid and having a bubble movable therewithin and said means for aligning said frame comprises a spring tensioning device interposed between and operatively connecting said handle and said frame for exerting a determinable tension on said instrument and said tape to which it is coupled.

5. An instrument as claimed in claim 3 wherein the curvature of said spirit level tube is correlated to the predetermined length of said tape and to varying slope angles of said tape in accordance with the approximate relationships:

$$R = T\sqrt{2 \text{ vers } A}$$
$$L = T \text{ vers } A$$

where R is the radius of curvature of said tube for an incremental length L, T is the predetermined length of said tape expressed in the same linear units as R and L, and A represents a slope angle at which said tape is disposed.

6. An instrument as claimed in claim 3 wherein said level seeking device comprises an elongate curved spirit level tube substantially filled with liquid and having a bubble movable therewithin and said means for aligning said frame comprises an optical sight device mounted on said frame in predetermined relationship thereto.

7. An instrument as claimed in claim 6 wherein the curvature of said spirit level tube is correlated to the predetermined length of said tape and to varying slope angles of said tape in accordance with the approximate relationships:

$$R = T\sqrt{2 \text{ vers } A}$$
$$L = T \text{ vers } A$$

where R is the radius of curvature of said tube for an incremental length L, T is the predetermined length of said tape expressed in the same linear units as R and L, and A represents a slope angle at which said tape is disposed.

8. An instrument as claimed in claim 6 further comprising means within said spirit level tube partitioning a small control volume therewithin and including a spring-biased valve member for controlling the flow of liquid into and out of said control volume and for varying the effective size of said bubble movable within said tube.

9. An instrument as claimed in claim 6 and further comprising an elongate indicia bearing scale secured adjacent said tube and a pointer member movable along said scale and said tube to correlate the location of said bubble within said tube to indicia on said scale, said indicia being correlated to the length of said tape and to varying slope angles of said tape and functioning as the aforementioned means for indicating a correction distance.

10. An instrument as claimed in claim 9 and further comprising an indicia bearing correction distance tape mounted on said frame and operatively connecting the same to said measuring tape, said correction tape being extensible relative to said frame for effectively adding to the length of said measuring tape and functioning as the aforementioned means for locating a correction point.

11. An instrument as claimed in claim 10 wherein said handle means includes a tape gripping member for exerting a restraining force on said correction distance tape upon the instrument being supported from said handle means so as to ensure that inadvertent slippage of said correction distance tape does not occur.

12. A slope compensator instrument for use with a surveyor's distance measuring tape of predetermined length in locating two points along a line which are spaced apart a predetermined true horizontal distance without necessitating complex mathematical calculation to correct for an elevation difference between the two points, the instrument comprising a frame, handle means operatively connected to said frame and adapted to be gripped by an operator for holding the instrument during use, an indicia bearing correction distance tape mounted on said frame and including tape engaging means adapted for coupling the instrument to one end of a surveyor's tape, an elongate curved spirit level tube carried by said frame and substantially filled with liquid and having a bubble movable therewithin, said spirit level tube being curved substantially throughout the length thereof on a common radius so that the length of said tube lies substantially on an arc of a circle, an elongate indicia bearing scale secured adjacent said tube, and a pointer member movable along said scale and said tube to correlate the location of said bubble within said tube to indicia on said scale, said indicia being correlated to the length of said measuring tape and to varying slope angles of said measuring tape for indicating a correction distance required to correct the length of said measuring tape so that the horizontal projections of said corrected length is equal to said true horizontal distance between said two points, said correction tape being extensible relative to said frame for effectively adding to the length of said measuring tape for locating a correction point corresponding to one of said two points which when projected vertically to the surface being surveyed is spaced a true horizontal distance equal to the length of the measuring tape from a point at the opposite end of said measuring tape corresponding to the other of said two points.

References Cited

UNITED STATES PATENTS

| | | | |
|---|---|---|---|
| 1,398,853 | 11/1921 | Ginzbourg | 33—71 |
| 1,654,164 | 12/1927 | Eldridge | 33—71 |
| 3,052,375 | 9/1962 | Kyser | 33—207 XR |

LEONARD FORMAN, *Primary Examiner.*

L. ANDERSON, *Assistant Examiner.*

PATENT OFFICE

Washington. D.C. 20231

UNITED STATES PATENT OFFICE
CERTIFICATE OF CORRECTION

Patent No. 3,408,741                                               November 5, 1968

John G. Bane

It is certified that error appears in the above identified patent and that said Letters Patent are hereby corrected as shown below:

Column 1, line 42, "quitet" should read -- quite --. Column 4, line 51, "1" should read -- 11 --; line 65, "comensator" should read -- compensator --. Column 5, line 44, "spiral" should read -- spirit --. Column 8, lines 10 to 12, cancel "tape 54 from within the tape case 51 to bring the indicated correction distance". Column 9, lines 28 and 29, cancel "[end-to-end]".

Signed and sealed this 3rd day of March 1970.

(SEAL)
Attest:

Edward M. Fletcher, Jr.                          WILLIAM E. SCHUYLER, JR.

Attesting Officer                                              Commissioner of Patents